US008731475B1

(12) United States Patent
Youngs et al.

(10) Patent No.: US 8,731,475 B1
(45) Date of Patent: May 20, 2014

(54) METHOD AND SYSTEM FOR DETERMINING ENVIRONMENTAL CHARACTERISTICS OF A CALLED COMMUNICATION DEVICE

(75) Inventors: Simon Youngs, Overland Park, KS (US); Gary Koller, Overland Park, KS (US); Piyush Jethwa, Overland Park, KS (US); Mark Peden, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 261 days.

(21) Appl. No.: 12/649,918

(22) Filed: Dec. 30, 2009

(51) Int. Cl.
*H04B 1/00* (2006.01)

(52) U.S. Cl.
USPC .............. 455/63.1; 455/67.11; 455/67.13; 455/222; 455/223; 455/220

(58) Field of Classification Search
USPC .......... 455/63.1, 67.11, 67.13, 222, 223, 220, 455/224, 296, 234.1
See application file for complete search history.

(56) References Cited

U.S. PATENT DOCUMENTS

| | | | |
|---|---|---|---|
| 4,163,283 A * | 7/1979 | Darby | 701/120 |
| 5,329,578 A | 7/1994 | Brennan et al. | |
| 5,761,639 A | 6/1998 | Takebayashi et al. | |
| 5,764,730 A | 6/1998 | Rabe et al. | |
| 5,970,446 A * | 10/1999 | Goldberg et al. | 704/233 |
| 6,018,671 A | 1/2000 | Bremer | |
| 6,324,499 B1 | 11/2001 | Lewis et al. | |
| 6,463,278 B2 | 10/2002 | Kraft et al. | |
| 6,496,578 B1 | 12/2002 | Chen et al. | |
| 6,529,723 B1 | 3/2003 | Bentley | |
| 6,686,839 B2 * | 2/2004 | Chou et al. | 340/540 |
| 6,690,672 B1 | 2/2004 | Klein | |
| 6,766,176 B1 * | 7/2004 | Gupta et al. | 455/550.1 |
| 6,792,084 B1 | 9/2004 | Gross et al. | |
| 6,795,544 B1 | 9/2004 | D'Arcy et al. | |
| 6,862,359 B2 * | 3/2005 | Nordqvist et al. | 381/312 |
| 6,928,306 B2 | 8/2005 | Matsuda et al. | |
| 6,944,474 B2 | 9/2005 | Rader et al. | |
| 7,181,229 B2 | 2/2007 | Singh et al. | |
| 7,250,846 B2 * | 7/2007 | Ebling et al. | 340/7.28 |
| 2001/0011028 A1 | 8/2001 | Wendelrup | |

(Continued)

FOREIGN PATENT DOCUMENTS

WO 2005/050961 A1 6/2005

OTHER PUBLICATIONS

Salvatore Salamone, "Safer Texting and Calling While Driving," Progressive Casualty Insurance Company, printed on Apr. 7, 2009.

(Continued)

*Primary Examiner* — Khai M Nguyen

(57) ABSTRACT

A first communication device receives a communication from a second communication device. The communication could be part of the signaling used to establish a call to the second communication device or an audio signal that the second communication device conveys after its user has answered the call and started speaking. Based on the communication from the second communication device, the first communication device provides a user-discernible indication regarding the environment in which the second communication device is being used, such as an indication that the second communication device is being used with a speakerphone. If the second communication device is being used in a vehicle, the first communication device may also provide a user-discernible indication regarding the operational status of the vehicle, such as whether the vehicle is in motion and/or the number of occupants in the vehicle.

12 Claims, 4 Drawing Sheets

(56) References Cited

U.S. PATENT DOCUMENTS

| | | | |
|---|---|---|---|
| 2002/0010008 A1 | 1/2002 | Bork et al. | |
| 2002/0076033 A1 | 6/2002 | Baweja et al. | |
| 2002/0090069 A1 | 7/2002 | Yaker | |
| 2002/0123329 A1 | 9/2002 | Murray | |
| 2002/0128000 A1* | 9/2002 | do Nascimento, Jr. | 455/414 |
| 2002/0193080 A1 | 12/2002 | Komsi et al. | |
| 2002/0194331 A1* | 12/2002 | Lewis et al. | 709/224 |
| 2003/0112945 A1 | 6/2003 | Brown et al. | |
| 2003/0112956 A1 | 6/2003 | Brown et al. | |
| 2004/0002838 A1 | 1/2004 | Oliver et al. | |
| 2004/0127203 A1 | 7/2004 | Markki et al. | |
| 2008/0159547 A1* | 7/2008 | Schuler et al. | 381/56 |
| 2008/0300871 A1* | 12/2008 | Gilbert | 704/233 |
| 2011/0295604 A1* | 12/2011 | Cohen et al. | 704/249 |
| 2013/0072251 A1* | 3/2013 | Kim et al. | 455/550.1 |

OTHER PUBLICATIONS

Peter Svensson, "New Service to Stop Loose Lips from Crashing Cars," ABC News Internet Ventures, printed on Aug. 20, 2009.

Nuria Oliver et al., "Layered Representations for Human Activity Recognition," Proceedings of the 4th IEEE International Conference on Multimodal Interfaces, 2002.

Jafar Adibi et al., "Self-similar Layered Hidden Markov Model," Proceedings of the 5th European Conference on Principles of Data Mining and Knowledge Discovery, 2001.

Samy Bengio, "An Introduction to Statistical Machine Learning, Hidden Markov Models," Dalle Molle Institute for Perceptual Artificial Intelligence (IDIAP), 2002.

Sergios Theodoridis et al., "Pattern Recognition," pp. 316-333, Academic Press, 1999.

U.S. Appl. No. 10/391,269, filed Mar. 18, 2003, titled "Method and System for Determining an Environment of a Mobile Station".

U.S. Appl. No. 12/229,235, filed Sep. 14, 2009, titled "Method and system for using a hands-free-audio profile to limit use of a wireless communication device".

myLot, "Do you make sure to maintain speakerphone etiquette?" blog postings, printed on May 28, 2009.

* cited by examiner

METHOD AND SYSTEM FOR DETERMINING ENVIRONMENTAL CHARACTERISTICS OF A CALLED COMMUNICATION DEVICE

BACKGROUND

Wireless communication devices, such as cell phones, are often used to make or receive calls while the user is operating a vehicle. To provide greater safety while driving, a cell phone may be used with a "hands free" system that allows the user to communicate without the need to hold the cell phone in the user's hands. Such hands free systems typically include a speakerphone system that is communicatively coupled to the wireless communication device, for example, using a Bluetooth™ wireless connection.

Although such vehicle-based speakerphone systems can make driving while talking on a cell phone safer, the speakerphone may also enable other occupants in the vehicle to hear the conversation. This can be particularly problematic when the cell phone receives an incoming call. The caller may not know that the called party is using a speakerphone and may begin communicating private information without realizing that others may be able to hear it.

Accordingly, there is a need to determine when a called cell phone or other communication device is being used with a speakerphone and/or other aspects of the environment in which a called communication device is being used.

Overview

In a first principal aspect, an exemplary embodiment provides a method for a first communication device that is in communication with a second communication device. The first communication device receives an audio signal from the second communication device. The first communication device determines at least one environmental characteristic of the second communication device by analyzing the audio signal. The first communication device provides a user-discernible indication of the at least one environmental characteristic of the second communication device.

In a second principal aspect, an exemplary embodiment provides a method for a wireless communication device in a vehicle. The wireless communication device receives a request to accept a call from a calling party. At least one environmental characteristic of the wireless communication device is determined. The wireless communication device indicates the at least one environmental characteristic to the calling party.

In a third principal aspect, an exemplary embodiment provides a wireless communication device comprising a first transceiver for wirelessly communicating with a wireless telecommunications network, a second transceiver for wirelessly communicating with a vehicle-based speakerphone system, and a controller communicatively coupled to the first and second transceivers. The controller is configured to (i) receive via the second transceiver a signal from the vehicle-based speakerphone system, (ii) determine at least one environmental characteristic based on the signal, and (iii) cause the first transceiver to transmit at least one indication of the at least one environmental characteristic.

DETAILED DESCRIPTION OF EXEMPLARY EMBODIMENTS

1. Introduction

Figure 1:
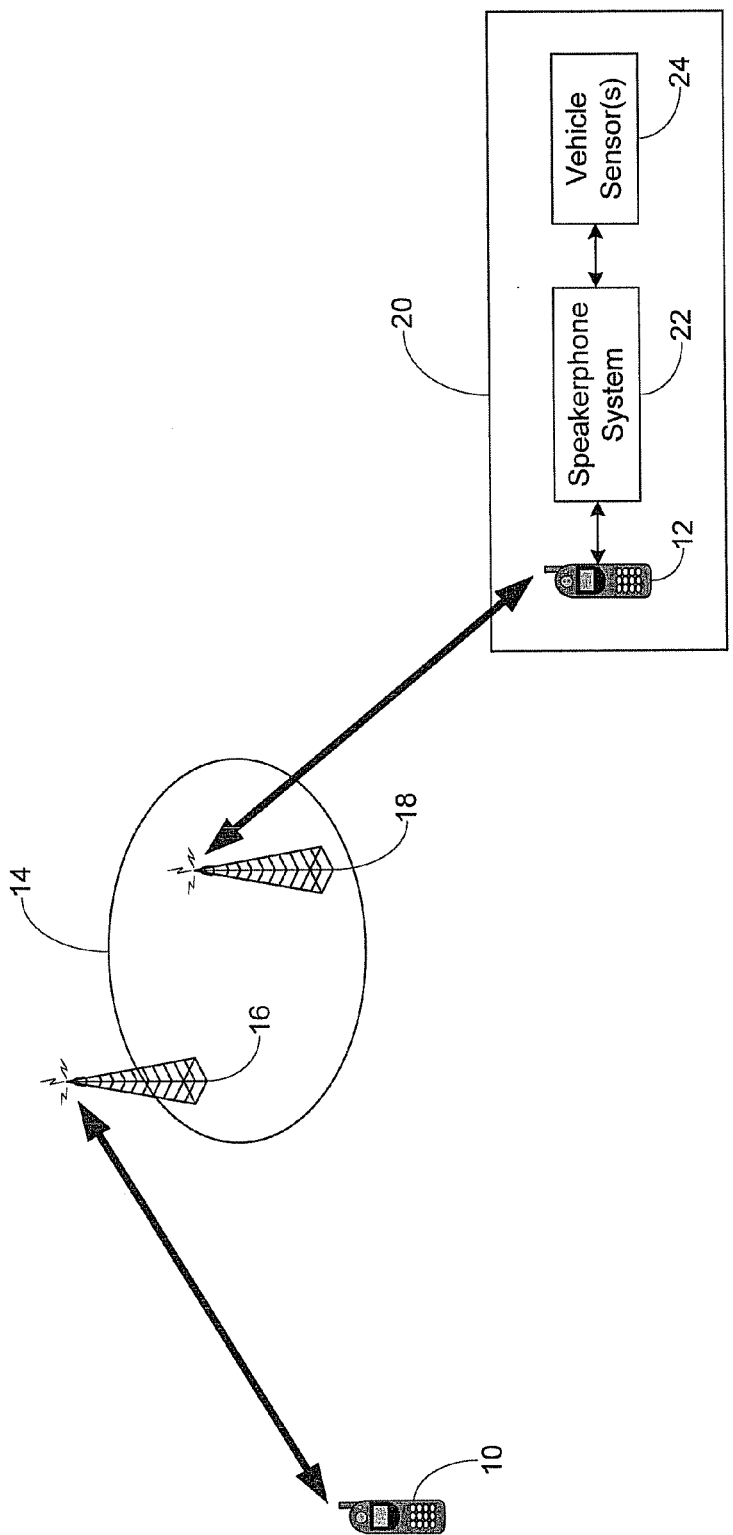
FIG. 1 is a block diagram illustrating a configuration for wireless communication between a first communication device and a second communication device, in accordance with an exemplary embodiment.

A first communication device may receive a communication from a second communication device and, based on that communication, the first communication device may provide an indication to its user regarding the environment in which the second communication device is being used. As one example, the first communication device may indicate that the second communication device is being used with a speakerphone. As another example, the first communication device may indicate that the second communication device is being used in a vehicle and may also indicate an operational status of the vehicle, such as whether the vehicle is in motion and/or the number of occupants in the vehicle. The first communication could also indicate other environmental characteristics, such as its geographic location, the current outside temperature, weather conditions, or traffic congestion.

Such indications may beneficially assist the user of the first communication device in deciding whether to or how to communicate with the user of the second communication device. For example, based on an indication that the second communication device is being used with a speakerphone or is being used in a vehicle with multiple occupants, the user of the first communication device may decide not to discuss private matters during the call. Further, based on an indication that the second communication device is being used in a moving vehicle, the user of the first communication device may decide not to proceed with the call and may instead call the second communication device at a later time or leave a voicemail or text message.

The communication from the second communication device may occur as part of the signaling used to set up a call from the first communication device to the second communication device. For example, the second communication device, while in a vehicle, may receive a request to accept a call from the first communication device. In response, the second communication device may determine one or more characteristics of its environment within the vehicle (e.g., whether the vehicle is in motion, the number of occupants of the vehicle, and/or whether a vehicle-based speakerphone system is being used) and/or one or more characteristics of the environment outside of the vehicle (such as outside temperature, weather conditions, and/or traffic congestion). The second communication device may then communicate indications of these environmental characteristics to the first communication device.

In some cases, the second communication device may automatically decline the call based on one or more environmental characteristics, such as when the vehicle is in motion or moving faster than a threshold speed, and may indicate the environmental characteristic as a reason for declining the call. Alternatively or additionally, the second communication device may automatically provide other call handling based on one or more environmental characteristics, such as transferring the call to a voicemail system or forwarding the call to another telephone number.

Alternatively, the communication from the second communication device may occur once a call between the first and second communication devices has been established. For example, the communication could be the audio signal that the second communication device conveys during the call. The audio signal may include speech from the user of the second communication device, as well as background noise that may be indicative of the manner or environment in which the second communication device is being used. The first communication device may analyze the audio signal to determine an environmental characteristic of the second communication device, such as whether the second communication device is being used with a speakerphone or is being used in a vehicle. The first communication device may then provide an indication of the usage characteristic to its user.

In one example of this approach, the first communication device may determine from the background noise level and/or from the presence of an echo in the audio signal that the second communication device is being used with a speakerphone. Similarly, the first communication device may determine from a sudden rise in the background noise level that the second communication device has just entered a speakerphone mode. As another example, the first communication device may determine from the presence of motor sounds in the audio signal that the second communication device is being used in a moving vehicle.

The second communication device could be a wireless communication device, such as a wireless telephone. Thus, the second communication device could be mobile and could be used in any number of different environments. As a result, it may be useful for a caller to have information regarding the second communication device's current environment, so that the caller can adjust his or her communication accordingly.

Alternatively, the second communication device could be a landline communication device, such as a desktop telephone. In that case, it may be useful for the caller to know whether the second communication device is being used with a speakerphone. For example, the caller may not wish to discuss private matters over a speakerphone.

The first communication device could also be either a wireless communication device or a landline communication device. In either case, the first communication device may be configured to provide an indication to its user regarding the environment in which the second communication device is being used, such as whether the second communication device is being used with a speakerphone.

2. Exemplary Configuration

For purposes of illustrating an exemplary embodiment, FIG. 1 shows a configuration in which a first communication device 10 communicates with a second communication device 12. In this example, communication devices 10 and 12 are wireless communication devices that communicate via a wireless telecommunications network 14. Wireless telecommunications network 14 could be a cellular network in which different base stations provide wireless coverage in different areas. Thus, first communication device 10 may be in wireless communication with a first base station 16, and second communication device 12 may be in wireless communication with a second base station 18.

The wireless communications between communication devices 10 and 12 and wireless telecommunications network 14 may be in accordance with cdma2000, EVDO, GSM, WiMAX (IEEE 802.16), or other wireless protocol. Communication devices 10 and 12 could use either the same protocol or a different protocol for wireless communication. In addition, while FIG. 1 shows communication devices 10 and 12 in wireless communication with different base stations, it is to be understood that they could be in wireless communication with the same base station.

In the example illustrated in FIG. 1, second communication device 12 is located in a vehicle 20. Vehicle 20 could be, for example, a passenger car, a truck, a tractor, or other type of vehicle. More particularly, second communication device 12 is communicatively coupled to a speakerphone system 22 in vehicle 20. Speakerphone system 22 could be either built into vehicle 20 or removably mounted in vehicle 20. In some embodiments, speakerphone system 22 may use the vehicle's speaker system, such as speakers that are used by a radio or entertainment system in vehicle 20. Alternatively, speakerphone system 22 may use a speaker that is separate from the vehicle's speaker system.

Speakerphone system 22 may enable handsfree operation of second communication device 12 in vehicle 20. For example, speakerphone system 22 may enable a user to conveniently engage in audio communication without the user holding second communication device 12 in the hand. It is to be understood that the user may still need to press one or more buttons on communication device 12 or speakerphone system 22 in order to originate calls or accept incoming calls. Alternatively, speakerphone system 22 may enable voice-activated origination and/or acceptance of calls.

Communication device 12 may be communicatively coupled with speakerphone system 22 using either a wireless or wired connection. A wireless connection might be achieved, for example, by using short range radio frequency (RF) communication, such as Bluetooth or WiFi, or by using infrared communication. A wired connection might be achieved, for example, by placing communication device 12 in a cradle or connecting it to a cable.

Speakerphone system 22 may be communicatively coupled to one or more vehicle sensor(s) 24 in vehicle 20. Vehicle sensors 24 may sense whether vehicle 20 is in motion, the speed of vehicle 20, the number of occupants in vehicle 20, the outside temperature at vehicle 20, and/or other aspects of the status of vehicle 20. Speakerphone system 22 may be configured to obtain vehicle status information from vehicle sensors 24, either automatically or in response to requests from communication device 12, and to communicate the vehicle status information to communication device 12.

As described in more detail below, communication device 12 may be configured to determine at least one characteristic of its environment in vehicle 12, for example, based on signals that communication device 12 receives from speakerphone system 22. In particular, communication device 12 may determine from its communication link with speakerphone system 22 that it is being used with a speakerphone. Communication device 12 may also determine one or more environmental characteristics from vehicle status information it receives from speakerphone system 22. In addition, communication device 12 could determine one or more environmental characteristics from other sources of information. For example, communication device 12 may subscribe to third party location-based services that provide the location of communication device 12 and/or conditions at the location of communication device 12, such as weather conditions (e.g., whether there is ice, snow, fog, or other inclement weather in the area) or traffic conditions (e.g., how much traffic congestion there is in the area).

Second communication device 12 may also be configured to communicate one or more indications of environment characteristics (e.g., whether it is being used with a speakerphone and/or in a moving vehicle) to first communication device 10, for example, in response to a request to accept a call from first communication device 10. The first communication device 10 may, in turn, indicate the environmental characteristics to its user. In this way, the user of first communication device 10 can make decisions regarding whether or how to communicate with second communication device 12 based on the environment in which it is being used. Alternatively, first communication device 10 may determine usage and/or environmental characteristics of second communication device 12 in other ways, such as by analyzing an audio signal from second communication device 12.

3. Exemplary Methods

Figure 2:
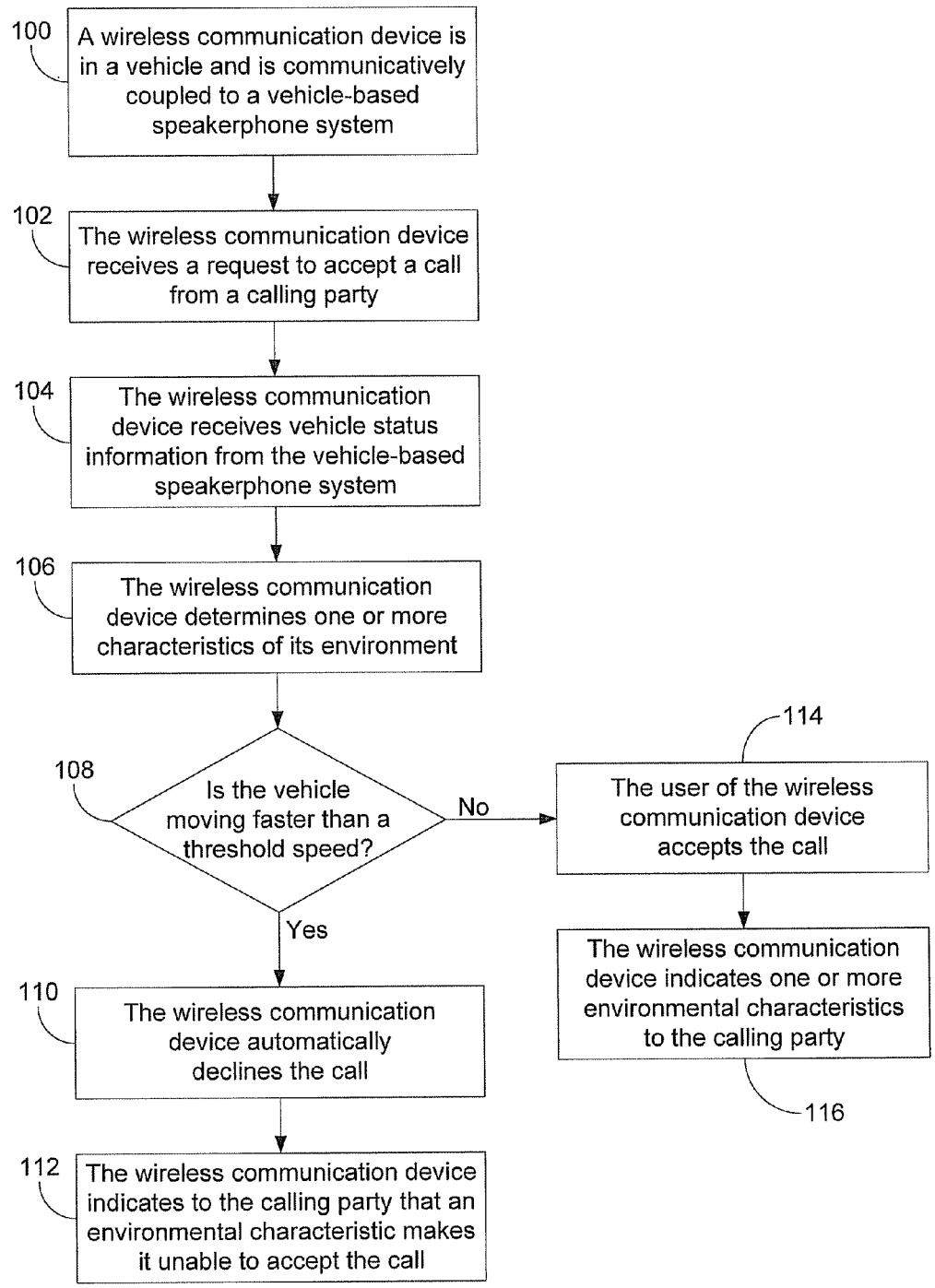
FIG. 2 is a flow chart illustrating a method, in accordance with an exemplary embodiment.

FIG. 2 is a flow chart illustrating an exemplary method. This exemplary method is explained with reference to the configuration shown in FIG. 1. It is to be understood, however, that the method could also be applied to other configurations.

In this example, the method begins with a wireless communication device that is located in a vehicle and is communicatively coupled to a vehicle-based speakerphone system, as indicated by block 100. With reference to FIG. 1, the wireless communication device could be second communication device 12 that is in vehicle 20 and communicatively coupled to speakerphone system 22.

At some point, the wireless communication device receives a request to accept a call from a calling party (e.g., first communication device 10), as indicated by block 102. In response, the wireless communication device receives vehicle status information from the vehicle-based speakerphone system, as indicated by block 104. The vehicle status information may include, for example, the speed of the vehicle and the number of occupants in the vehicle.

The wireless communication device also determines one or more characteristics of its environment, as indicated by block 106. For example, the wireless communication device may determine from its communication link with the vehicle-based speakerphone system that it is inside a vehicle and is being used with a speakerphone. The wireless communication device may also determine one or more environmental characteristics from the vehicle status information it received from the vehicle-based speakerphone system, such as whether the wireless communication device is in a moving vehicle and/or or whether there are multiple occupants in the vehicle. Alternatively or additionally, the wireless communication device may determine one or more environmental characteristics (e.g., its geographic location, the current weather conditions in the area, and/or the amount of traffic congestion in the area) from third party location-based services.

Whether the wireless communication device allows the user to accept the call from the calling party may depend on one or more of the environmental characteristics, such as the speed of the vehicle. Thus, the wireless communication device may determine whether the vehicle is moving faster than a threshold speed, as indicated by block 108. If the vehicle exceeds this threshold speed, then the wireless communication device may automatically decline the call, as indicated by block 110. The wireless communication device may be configured to automatically decline calls in such cases for safety reasons or in order to comply with local regulations. The wireless communication device may also indicate to the calling party that an environmental characteristic makes it unable to accept the call, as indicated by block 112. For example, the wireless communication device may transmit an indication that it is in a moving vehicle. In response, the calling party's communication device may provide a textual indication on a display screen, or other type of user-discernible indication, that the called party's communication device is unavailable because it is in a moving vehicle.

On the other hand, if the vehicle is not moving or is moving slower than the threshold speed, the user of the wireless communication device may be able to accept the call, as indicated by block 114. When the call is accepted, the wireless communication device may indicate one or more of the environmental characteristics to the calling party, as indicated by block 116. For example, the wireless communication device may transmit indications that it is being used with a speakerphone, that it is in a moving vehicle, that multiple occupants are present in the vehicle, and/or indications of other characteristics of its environment. In response, the calling party's communication device may convey these indications to its user, for example, by providing textual indications on a display screen or in some other manner.

In this way, the calling party can be informed when the called communication device is being used in an environment that may not be appropriate for discussing private matters (i.e., when the called communication device is being used with a speakerphone and/or being used in the presence of others). Further, if the called communication device is being used in a moving vehicle, the calling party may decide to call at a later time or to use an alternative form of communication, such as leaving a voicemail or text message.

Figure 3:
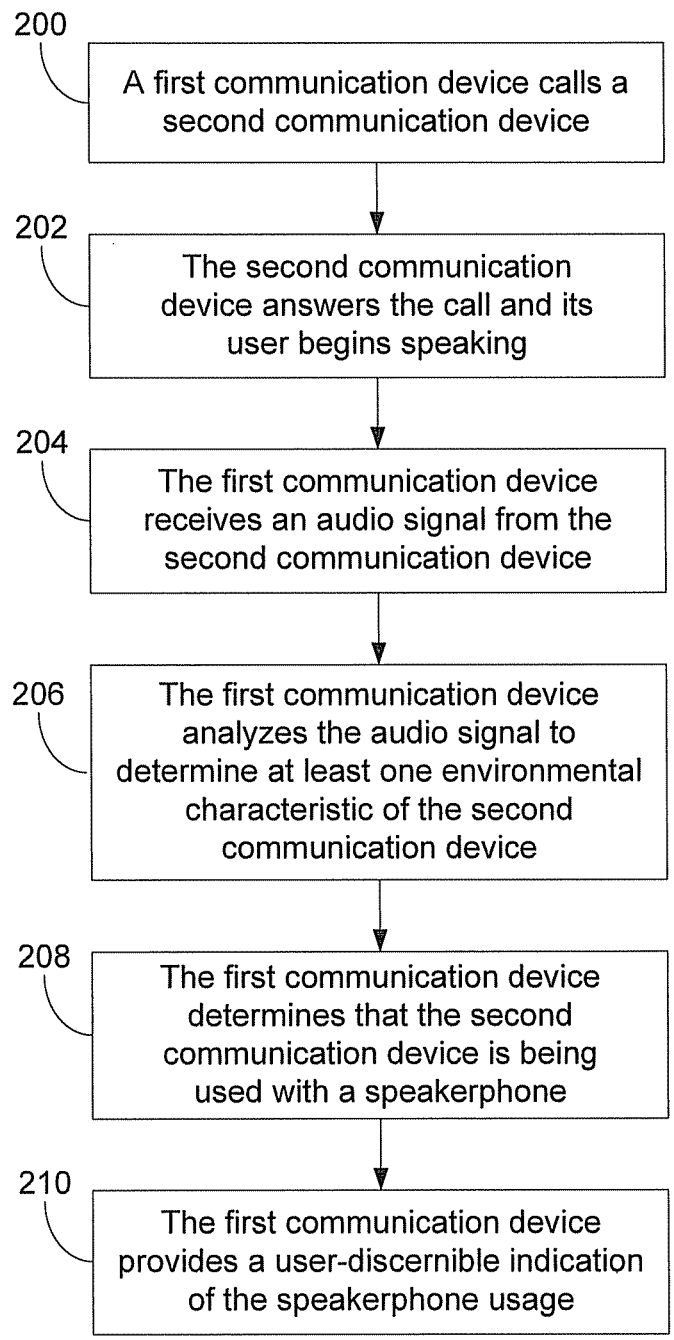
FIG. 3 is a flow chart illustrating a method, in accordance with an exemplary embodiment.

It is to be understood, however, that a calling party can determine one or more environmental characteristics of the called party's communication device in other ways. FIG. 3 is a flow chart illustrating one such alternative method. The method may begin when a first communication device calls a second communication device, as indicated by block 200. The second communication device answers the call and its user begins speaking, as indicated by block 202. For example, the user may answer the call and say "Hello."

The first communication device receives an audio signal from the second communication device, as indicated by block 204. The audio signal may include the user's speech from the second communication device, as well as background noise. The first communication device may then analyze the audio signal to determine at least one environmental characteristic of the second communication device, as indicated by block 206. For example, the first communication device may analyze the audio signal to determine whether the second communication device is being used in a speakerphone more (e.g., based on the level of background noise or the presence of echo) or is being used in a vehicle (e.g., based on the presence of sounds that are indicative of a moving vehicle). To make this determination, first communication device may use a Hidden Markov Model, neural network, or other type of signal processing algorithm to determine the environment of the second communication device. The use of Hidden Markov Models to determine environments is described in U.S. application Ser. No. 10/391,269, filed Mar. 18, 2003, which is incorporated herein by reference.

In this example, the first communication device determines that the second communication device is being used with a speakerphone, as indicated by block 208. In response, the first communication device provides a user-discernible indication of the speakerphone usage, as indicated by block 210. The user-discernible indication could be, for example, a textual indication that is displayed on a display screen of the first communication device. Alternatively, the user-discernible indication could be a graphical indication, auditory indication, tactile indication, or other indication that is discernible by the user.

Although the use of a speakerphone was the environmental characteristic determined in the example of FIG. 3, it is to be understood that the first communication device could determine other environmental characteristics by analyzing the audio signal from the second communication device. Further, the first communication device could provide user-discernible indications of such other environmental characteristics.

4. Exemplary Wireless Communication Device

Figure 4:
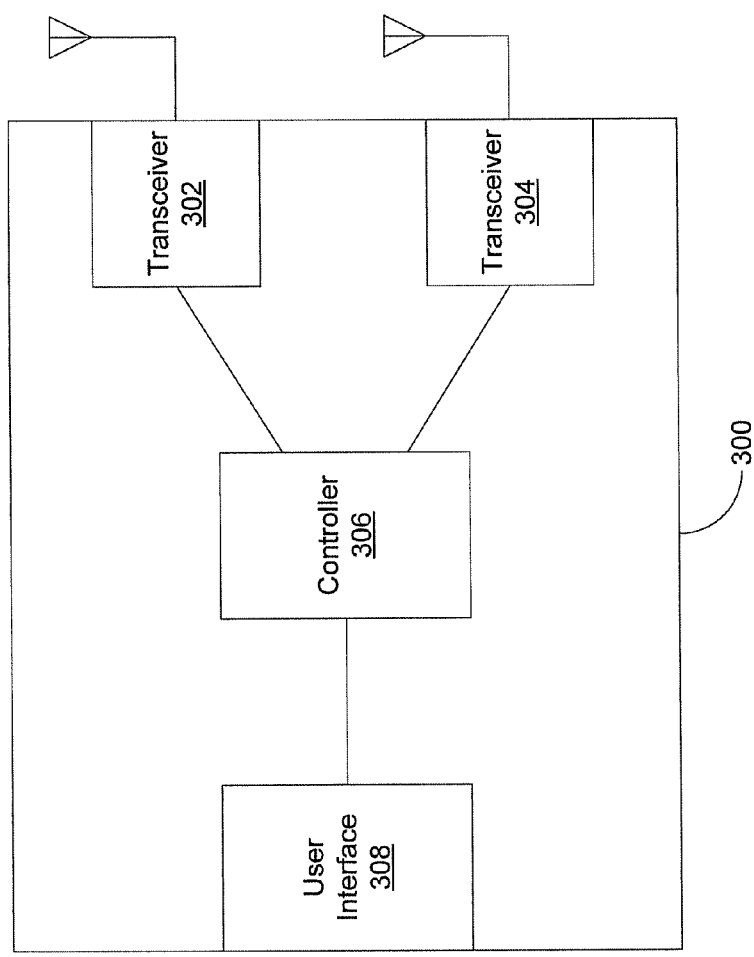
FIG. 4 is a block diagram of a wireless communication device, in accordance with an exemplary embodiment.

FIG. 4 illustrates a wireless communication device 300 that could be used in the methods illustrated in FIG. 2 and FIG. 3. Wireless communication device 300 includes a first transceiver 302 for wirelessly communicating with a wireless telecommunications network, such as a cellular network, and a second transceiver 304 for wirelessly communicating with a vehicle-based speakerphone system, for example, by using a short-range RF protocol, such as Bluetooth or WiFi, or by using infrared communication.

The functioning of wireless communication device 300 may be controlled by a controller 306 that is communicatively coupled to first transceiver 302 and second transceiver 304. Controller 306 may also be communicatively coupled to a user interface 308. User interface 308 may include a keypad, touch screen, microphone, or other devices for receiving input from the user, and may include a display screen, speaker, or other devices for conveying output to the user.

Controller 306 may be configured to determine one or more characteristics of the environment of wireless communication device 300. To do this, controller 306 may sense whether communication device 300 is communicatively coupled to a speakerphone system. For example, controller 306 may determine whether second transceiver 304 is receiving a signal or is otherwise in wireless communication with a speakerphone system. Controller 306 may also receive other environmental information from a vehicle-based speakerphone system. For example, controller 306 may receive, via second transceiver 304, a signal that includes vehicle status information. Based on the vehicle status information or other information contained in the signal, controller 306 and determine one or more characteristics of the vehicle, such as the vehicle's speed, location, and number of occupants.

Once controller 306 has determined one or more environmental characteristics, controller 306 may cause first transceiver 302 to transmit one or more indications of the one or more environmental characteristics. Controller 306 may do so, for example, in response to a request to accept an incoming call.

Wireless communication device 300 may also receive one or more indications of the environment of a remote device with which it is communicating. For example, controller 306 may receive such indications via first transceiver 302. In response to receiving such indications, controller 306 may cause user interface 308 to provide one or more user-discernible indications of the environmental characteristics of the remote device, such as whether the remote device is using a speakerphone or is located in a vehicle. Such user-discernible indications could be, for example textual indications displayed on a display screen of user interface 308. Alternatively, controller 306 may analyze an audio signal from the remote device to determine characteristics of its environment. For example, the background noise level or presence of echo in the audio signal may indicate that the remote device is being used with a speakerphone.

To perform these functions, controller 306 may include a processor that executes software program instructions that are stored in either volatile or non-volatile memory. Alternatively, controller 306 may be configured to perform some or all of these functions using hardware or firmware.

5. Conclusion

Exemplary embodiments of the present invention have been described above. Those skilled in the art will understand, however, that changes and modifications may be made to these embodiments without departing from the true scope and spirit of the invention, which is defined by the claims.

What is claimed is:

1. A method, comprising:
 a first communication device receiving an audio signal from a second communication device during a call established between said first and second communication devices, wherein said call is established via a wireless telecommunications network, and wherein said audio signal includes speech and background noise;
 during said call, said first communication device analyzing said audio signal from said second communication device to determine at least one environmental characteristic of said second communication device based on sounds in said audio signal; and
 during said call, said first communication device causing a user interface in said first communication device to provide a user-discernible indication of said at least one environmental characteristic of said second communication device.

2. The method of claim 1, wherein said first communication device analyzing said audio signal from said second communication device to determine said at least one environmental characteristic of said second communication device based on sounds in said audio signal comprises:
 said first communication device determining whether said second communication device is being used with a speakerphone.

3. The method of claim 1, wherein said first communication device analyzing said audio signal from said second communication device to determine said at least one environmental characteristic of said second communication device based on sounds in said audio signal comprises:
 said first communication device determining whether said second communication device is being used in a vehicle.

4. The method of claim 1, wherein said first communication device analyzing said audio signal from said second communication device to determine said at least one environmental characteristic of said second communication device based on sounds in said audio signal comprises:
 said first communication device analyzing said background noise in said audio signal.

5. The method of claim 1, wherein said first communication device analyzing said audio signal from said second communication device to determine said at least one environmental characteristic of said second communication device based on sounds in said audio signal comprises:
 said first communication device detecting an echo in said audio signal.

6. The method of claim 1, wherein said first communication device is a wireless telephone.

7. The method of claim 1, wherein said second communication device is a wireless telephone.

8. The method of claim 7, wherein said second communication device is communicatively coupled to a vehicle-based speakerphone system.

9. The method of claim 1, wherein said user interface comprises a display screen, and wherein said user-discernible indication of said at least one environmental characteristic of said second communication device comprises a textual indication displayed on said display screen.

10. The method of claim 1, wherein said first communication device analyzing said audio signal from said second communication device to determine said at least one environmental characteristic of said second communication device based on sounds in said audio signal comprises:

said first communication device detecting sounds indicative of a moving vehicle in said audio signal.

11. The method of claim 1, wherein said speech is from a user of said second communication device.

12. The method of claim 1, wherein said audio signal includes motor sounds.

\* \* \* \* \*